United States Patent [19]

Koyanagi et al.

[11] 3,926,931

[45] Dec. 16, 1975

[54] METHOD FOR SUSPENSION-POLYMERIZING VINYL CHLORIDE

[75] Inventors: Shunichi Koyanagi, Naoetsu; Shigeru Arai, Yachiyo; Shigenobu Tajima, Naoetsu; Kazuhiko Kurimoto, Shimoyo-Shinden, all of Japan

[73] Assignee: Shinetsu Chemical Company, Tokyo, Japan

[22] Filed: July 25, 1973

[21] Appl. No.: 382,458

Related U.S. Application Data

[63] Continuation-in-part of Ser. No. 127,768, March 24, 1971, abandoned.

[30] Foreign Application Priority Data

Apr. 13, 1970   Japan.............................. 45-31755

[52] U.S. Cl..................... 260/92.8 W; 260/78.5 R; 260/78.5 CL; 260/80.3 R; 260/86.3; 260/87.1; 260/87.5 C; 260/87.5 G; 260/87.7; 260/88.1 P; 260/95

[51] Int. Cl.² ... C08F 1/11; C08F 3/30; C08F 15/00

[58] Field of Search ........ 260/92.8 W, 87.1, 87.5 C, 260/87.5 G, 78.5 C, 78.5 L, 78.5 R, 80.3 R, 87.7

[56] References Cited
UNITED STATES PATENTS 3,578,649   5/1971   Badgnerahanian ................ 260/92.8
3,627,744   12/1971  Hopkins............................ 260/87.5

FOREIGN PATENTS OR APPLICATIONS 723,991   2/1955   United Kingdom.................... 260/9

OTHER PUBLICATIONS

Smith; A. F., Polyvinyl Chloride Production at Burghausen & Ludwigshafen, (1946, July 29).

*Primary Examiner*—Christopher A. Henderson, Jr.
*Attorney, Agent, or Firm*—Bierman & Bierman

[57] ABSTRACT

In a method for suspension-polymerizing at least one monomer taken from the class consisting of vinyl chloride and a mixture of vinyl monomers having vinyl chloride as a main component in the presence of a suspending agent and a polymerization catalyst in an aqueous medium under agitation and with primary cooling in a vessel, said vessel having a condenser for auxiliary cooling, a passageway between said vessel and said condenser, the improvement which comprises keeping said passageway closed until a conversion of at least 5% is obtained, then opening said passageway and maintaining said auxiliary cooling when said passageway is open.

4 Claims, No Drawings

METHOD FOR SUSPENSION-POLYMERIZING VINYL CHLORIDE

This application is a continuation-in-part application of copending application Ser. No. 127,768 filed Mar. 24, 1971 now abandoned, which claims the priority of Japanese application 45/31755 filed Apr. 13, 1970, which priority is also claimed herein.

This invention relates to an improved method for suspension-polymerizing vinyl chloride. More particularly, it is concerned with the suspension polymerization of vinyl chloride by use of a polymerization vessel equipped with a cooling jacket and a reflux condenser.

The suspension-polymerization of vinyl chloride is generally conducted in an aqueous medium containing a catalyst, a suspending agent and, if necessary, any other additive. In carrying out the polymerization, the aqueous medium containing the above-mentioned additives as well as vinyl chloride monomer is placed in a pressureproof polymerization vessel equipped with a stirrer and a water-cooling jacket. The contents of the vessel are then vigorously stirred while the temperature inside the vessel is maintained at a desired temperature in the range of from 30° to 70°C, through the course of the polymerization by operating the water-cooling jacket to remove heat generated by polymerization.

In the suspension-polymerization of vinyl chloride, however, the rate of polymerization rises suddenly when the polymerization enters its middle stage. This phenomenon is due to the insolubility of the polymer in the monomer and is generally called the "Tromsdorf Effect". It causes the increased generation of heat in the latter stages of the polymerization beyond the capacity of the cooling jacket, and consequently causes the accumulation of heat in the vessel and makes it difficult to obtain a polymer having a uniform degree of polymerization and good particle size distribution and porosity. Further, the surface area of the vessel does not increase in proportion to the increase in volume of the vessel to cope with productive operation on a larger scale. Consequently, the heat transfer area in the cooling jacket becomes insufficient.

To solve the above problems, it has been proposed that the polymerization vessel be equipped with a reflux condenser. The condenser is usually a heat exchanger of the coil type or multitubular type. It is connected to the polymerization vessel by a conduit pipe therethrough to flow vapors including vinyl chloride from the vessel to the condenser and return the condensed monomers to the vessel. Thus, the condenser is intended to make up for the drawback of a polymerization vessel equipped with a cooling jacket only.

However, the installation of a reflux condenser was found to cause the deposition of polymer scales where the monomers came into contact with the condenser as well as on the inside walls of the conduit pipe connecting the polymerization vessel with the condenser. Such scale deposition tends to block the condenser and the conduit pipe and virtually negates the function of the condenser. Further, the condenser and the conduit pipe have to be cleaned of the scales deposited thereon as each polymerization batch finished. Such cleaning work is unduly expensive and time consuming, resulting in a decrease of productivity. Furthermore, scale deposition degrades the quality of the product and endangers the operation of the polymerization apparatus.

U.S. Pat. No. 3,627,744 discloses a method wherein a reflux condenser is cut into the system by causing cooling water to flow therethrough when 10% conversion is attained, the condenser having been kept open to the polymerization vessel at all times. However, this method is not believed to have overcome the abovedescribed disadvantages. The monomer and polymerizable radical in the form of aqueous bubbles enter the condenser through the conduit connecting the condenser with the gaseous phase in the vessel before conversion reaches 10%, and form polymerization nuclei and further polymer scales therein.

With a view to avoiding the aforesaid disadvantages, the present invention provides an improvement in the conventional method of suspension-polymerizing vinyl chloride in the polymerization vessel equipped with means to remove polymerization heat including a cooling jacket and a reflux condenser.

It is an object of the invention to prevent the deposition of polymer scales in the condenser and the inside walls of the conduit pipe that eventually causes blockage of the piping and endangers the operation of the polymerization apparatus.

It is another object of the invention to carry out the polymerization operation by a continuous batch process, not being interrupted by cleaning out the condenser and the conduit pipe as each batch is finished with decrease in the heat-removing capacity of the condenser or degradation of the quality of the products.

Still another object of the invention is to enhance the productivity of the polymerization vessel and curtail the production costs by the absence of the time-consuming and expensive cleaning of the condenser and the conduit pipe.

A futher object is to provide such a process by which mass production by using a very large scale polymerization vessel may be effectively practised.

The above and further objects of the invention will be more clearly explained by the descriptions to follow hereinbelow.

The invention has been made based on the observation that, in the suspension polymerization of vinyl chloride where a pipe connecting the condenser with the gaseous phase of the polymerization vessel was provided with a mechanical means like a valve, if the condenser is isolated from the polymerization vessel by closing the valve till 5% conversion was attained and then, when the removal of the heat of polymerization is urgently required, the valve is opened to allow the condenser to work; it is possible to overcome the defect of the prior art condensing means and, at the same time, to prevent the inclusion of polymer scales in the final products and consequently to obtain products of good quality.

As stated already, in the suspension-polymerization of vinyl chloride, it is naturally believed that in the latter stages of polymerization when the Tromsdorf effect appears, reaction takes place more rapidly; consequently generating so much heat that the vaporization of vinyl chloride increases, and the increased monomer enters the condenser through the conduit pipe while being condensed and, as a result, increased polymer scale deposition takes place. However, if the condenser is kept from operation during the early stage of polymerization and operated only after conversion reaches 5%, there is no such polymer scale deposition. This is a surprising discovery of the inventors.

The inventors have observed that, in the suspension-polymerization of vinyl chloride, a remarkable bubbling of the polymerization medium usually takes place during the early stages of polymerization. As the result, the portion of the polymerization vessel housing the gaseous phase is filled with bubbles of the monomer, polymerizable radical and water. These bubbles enter the condenser through the conduit pipe, while it is open and not closed, thereupon first polymerization nuclei are formed in the condenser and the conduit pipe, followed by further polymerization taking place thereby. As a result, vinyl chloride polymer is deposited as scales on the surface of the condenser and on the inside walls of the piping. Such polymer scales lower the heat-exchanging coefficient of the condenser, and may cause blockage of the conduit pipe and the condenser.

However, when the conversion of the monomer to polymer is at least 5%, the suspending agent, which would cause bubble formation, becomes sufficiently absorbed by the suspended oil droplets which are then covered with polyvinyl chloride, so that the bubbling is thereafter much reduced. It is presumed that this is because of the condensation and recycling of the monomer only.

In general, polymerization reaction is not so intense while conversion remains below about 5%, and therefore sufficient heat of polymerization can be removed by means of the cooling jacket only, without the aid of the condenser. Even after the 5% conversion is reached, the condenser may be kept isolated from the polymerization vessel so long as the heat removal is sufficiently carried out by the cooling jacket. Provided, however, it is desirable that the condenser is made operative not long thereafter, say, immediately after the generation of polymerization heat or well before the heatremoving capacity of the cooling jacket is surpassed, since the late operation of the condenser tends to disturb the control of temperatures in the polymerization medium. Thus, the increased reaction heat generated by the increased polymerization rate can be rapidly removed.

Cooling by the condenser is virtually conducted by depriving the reaction product (vinyl chloride polymer) of its latent heat of evaporation by the direct evaporation of unreacted vinyl chloride monomer contained in the product. Thus, the desired prevention of accumulation of heat in the particles of the product can thereby be effected. As a result, the temperature within the polymerization vessel can be kept substantially constant, and a vinyl chloride polymer having a uniform degree of polymerization and superior porosity can be produced. In addition, a stirring effect accompanying the evaporation of the monomer contained in the product is obtained. As mentioned heretofore, because maximum stirring of the polymerization medium is required only in the early stages of the polymerization, mechanical stirring can be reduced while the condenser is in operation. Hence, a secondary advantage that can be obtained by the method of the invention is a saving in stirring power.

The heat-exchange apparatus useful for the improved method of the invention may be such that the condenser is connected to the polymerization vessel by a conduit pipe provided with a valve as the means for isolating or connecting the condenser and the vessel from and to each other, and that it is designed to flow the entire amount of condensate from the condenser to the vessel. In selecting a condenser of appropriate capacity the following should generally be considered: (i) the capacity and heat conductive area of the polymerization vessel used, (ii) the kind and amount of catalyst used, (iii) the rate of polymerisation (which depends upon the polymerization temperature), and (iv) the properties desired of the product.

The method of the present invention is used for the homopolymerization of vinyl chloride. However it may also be used for the polymerization of a mixture of monomers containing vinyl chloride as its main component and one or more copolymerizable monomers exemplified by vinyl esters, vinyl ethers, acrylic and methacrylic acids and their esters, aromatic vinyl monomers, maleic aicd and its anhydrides and esters, vinylidene halides, other vinyl halides, and monoolefins.

The suspension agents employed in the method of the invention include any of those well known materials useful for the suspension-polymerization of vinyl chloride including synthetic or natural polymeric materials, such as polyvinyl acetate, cellulose ethers and gelatin, which act as protective colloids. A nonionic or anionic surfactant may be employed together with the suspension agent, as required.

Further, the polymerization catalysts employed include any of those known catalysts which are exemplified by organic peroxides, such as lauroyl peroxide, benzoyl peroxide, isopropyl peroxydicarbonate, and acetyl cyclohexylsulfonyl peroxide, and azo compounds, such as azobisisobutyronitrile and dimethylvaleronitrile, alone or in combination.

Other additives useful for the suspension polymerization of vinyl chloride according to the invention may, at need, be higher alcohols, alkaline materials and inorganic powdery stabilizers.

The following examples are offered for the purpose of illustrating the method of the invention and not for the purpose of limiting same.

EXAMPLE 1

A stainless steel polymerization vessel (capacity: 1000 litres), equipped with a stirrer inside and an external multitubular condenser (heat exchanging area: 1 $m^2$) connecting to the vessel by a conduit pipe on which a valve is provided, was evacuated and filled with nitrogen gas. 200 kg of vinyl chloride, 500 kg of deionized water, 0.1 wt % (based on the weight of vinyl chloride) of partially saponified polyvinyl acetate, as a suspending agent, and 0.02 wt % (based on the weight of vinyl chloride) of azobisdimethylvaleronitrile, as a catalyst, were then placed in the vessel. The condenser was physically sealed from the polymerisation reactants by closing the valve. The temperature inside the vessel was then raised to 57°C to effect polymerization. When the conversion of monomer reached 2% (in other cases, 5%, 50%, and 70%), operation of the condenser was started by opening the valve. The degree of blockage of the condenser and the conduit pipe by the deposition of polymer scales is as given in Table 1. Throughout the repeated polymerization reactions by batches, no cleaning of the condenser and the conduit pipe was carried out.

TABLE 1

| Exp. No. | 1 | 2 | 3 | 4 |
|---|---|---|---|---|
| % Conversion at which operation of the condenser was started | 2 | 5 | 50 | 70 |
| Amount of polymer- | | | | |

TABLE 1-continued

| Exp. No. | 1 | 2 | 3 | 4 |
|---|---|---|---|---|
| ization medium condensed (kg/hr.) | 100 | 100 | 100 | 100 |
| Number of polymerization reactions repeated before the condenser became blocked | 1 (Both the condenser and the conduit pipe became completely blocked.) | 10 (Partial blockage of the conduit pipe.) | 17 (Partial blockage of the conduit pipe.) | 52 (Partial blockage of the conduit pipe.) |

Control

The procedure of Example 1 was repeated except that the valve on the conduit pipe between the condenser and the vessel was kept open since the start of polymerization. The operation of the condenser was started by flowing water thereinto when a conversion of 5% was reached. The polymerization was continued till both the condenser and the conduit pipe became completely blocked, the number of the polymerization reactions repeated being three.

EXAMPLE 2

The procedure of Example 1 was repeated except that the amount of vinyl chloride placed in the polymerization vessel was 250 kg, the amount of azobisdimethylvaleronitrile used was 0.03 wt % (based on the weight of the vinyl chloride), and the amount of polymerization medium condensed was 150 kg/hr. The relation between (i) the particle size distribution and the porosity (capacity of pores and plasticizer absorptivity) of the vinyl chloride polymer product and (ii) the % conversion at which operation of the condenser was started is given in Table 2.

TABLE 2

| Exp. No. | 5* | 6* | 7 | 8 |
|---|---|---|---|---|
| Amount of polymerization medium condensed (kg/hr.) | 0 | 150 | 150 | 150 |
| % Conversion at which operation of the condenser was started | ** | 3 | 10 | 40 |
| Porosity (cc/g) | 0.35 | 0.45 | 0.46 | 0.45 |
| Plasticizer absorpticity (PHR)*** | 23 | 35 | 35 | 35 |
| Particle size distribution: | | | | |
| 60 mesh through (%) | 99.9 | 92.3 | 99.6 | 99.8 |
| 80 mesh through (%) | 98.1 | 78.1 | 91.0 | 96.5 |
| 100 mesh through (%) | 68.5 | 49.1 | 67.3 | 66.4 |
| 115 mesh through (%) | 33.7 | 25.0 | 32.4 | 30.3 |
| 150 mesh through (%) | 6.9 | 3.2 | 6.5 | 4.0 |
| 200 mesh through (%) | 0.4 | 0.3 | 0.4 | 0.2 |

*Control.
**No use of condenser.
***PHR means parts of plasticizer absorbed by one hundred parts of polymer.

EXAMPLE 3

Two polymerization vessels, each as described in Example 1, were used except that one was equipped with the condenser, while the other was not. Each vessel was evacuated and then filled with nitrogen gas. 250 kg of vinyl chloride, 500 kg of water, 0.1 wt % of partially saponified polyvinyl acetate (based on the weight of the vinyl chloride) and either diisopropyl peroxydicarbonate (IPP) or azobisdimethylvaleronitrile (DMVN) in the amounts given in Table 3 were placed in each vessel. The condenser was physically sealed from the polymerisation reactants by closing the valve provided on the conduit pipe between the vessel and the condenser. Polymerization was started when the temperature inside the vessels was 57°C. Operation of the condenser was started by opening the valve as soon as the conversion of monomer reached 5%. The condenser was controlled in a manner such that the rate at which heat was removed by the condenser increased as the generation of heat by the polymerization increased. The polymerization conditions and the porosity of the polymer product are as given in Table 3.

TABLE 3

| Exp. No. | 9 | 10 | 11 | 12 | 13 | 14 | 15 | 16 | 17 | 18 | 19 | 20 |
|---|---|---|---|---|---|---|---|---|---|---|---|---|
| Amount of Catalyst DMVN | 0.02% | — | 0.04% | — | 0.06% | — | — | — | — | — | — | — |
| Amount of Catalyst IPP | — | — | — | — | — | — | 0.01% | — | 0.02% | — | 0.03% | — |
| Condenser | Not used | Used | Not used | Used | Not used | Used | Not used | Used | Not used | Used | Not Used | Used |
| Maximum reaction rate/Average reaction rate | 1.7 | 1.3 | 2.0 | 1.4 | 2.3 | 1.6 | 1.8 | 1.2 | 2.1 | 1.4 | 2.4 | 1.5 |
| Control of the temperature inside the vessel at a constant value when the reaction rate accelerated | Good | Good | Not good | Good | Not good | Good | Not good | Good | Not good | Good | Not good | Good |
| Amount of plasticizer absorbed by the polymer | 23 | 24 | 20 | 27 | 17 | 27 | 24 | 25 | 21.5 | 26 | 16 | 25 |

TABLE 3-continued

| Exp. No. | 9 | 10 | 11 | 12 | 13 | 14 | 15 | 16 | 17 | 18 | 19 | 20 |
|---|---|---|---|---|---|---|---|---|---|---|---|---|
| (PHR) | | | | | | | | | | | | |
| Porosity of polymer (cc/g) | 0.35 | 0.36 | 0.32 | 0.37 | 0.30 | 0.38 | 0.37 | 0.38 | 0.32 | 0.38 | 0.29 | 0.38 |

EXAMPLE 4

The procedure of Example 2 was repeated except that (i) 0.3 wt % of lauroyl peroxide (based on the weight of the vinyl chloride) was used in place of the azobisdimethylvaleronitrile and (ii) 0.1 wt % of sorbitan monolaurate (based on the weight of the vinyl chloride) was added in two experiments to the polymerization medium. The results obtained and the properties of the product are shown in Table 4.

EXAMPLE 5

Into a stainless steel polymerization vessel (capacity: 23 m$^3$) equipped with a multitubular type condenser (capacity: 30 m$^2$) connecting to the vessel by a conduit pipe on which a valve is provided were charged 10,000 kg of deionized water, 7,000 kg of vinyl chloride, and 0.08 wt % of partially saponified vinyl acetate based on the weight of the vinyl chloride in addition to dimethylvaleronitrile (DMVN) in varied amounts as indicated in the following table 5. The temperature inside the vessel was raised to 57°C, and polymerization was started. The polymerization conditions and the properties of the polymer product are shown in Table 5.

TABLE 4

| Exp. No. | 21 (Control) | 22 (Control) | 23 | 24 |
|---|---|---|---|---|
| Sorbitan monolaurate | Not added | Added | Added | Not added |
| Amount of the polymerization medium condensed (kg/hr.) | — | — | 150 | 150 |
| % Conversion at which operation of the condenser was started | — | — | 40 | 40 |
| Control of the temperature inside the vessel at a constant value when the reaction rate accelerated | Not good | Not good | Good | Good |
| Maximum difference between the temperature inside the vessel and that of the jacket | Over 30°C | Over 30°C | 9.5°C | 10°C |
| Plasticizer absorpticity (PHR) | 23 | 30 | 35 | 35 |
| Porosity (cc/g) | 0.35 | 0.4 | 0.44 | 0.45 |
| Apparent specific gravity | 0.495 | 0.463 | 0.455 | 0.455 |
| Particle size distribution: | | | | |
| 60 mesh through (%) | 99.9 | 99.9 | 99.7 | 99.9 |
| 80 mesh through (%) | 98.1 | 99.9 | 99.6 | 98.4 |
| 100 mesh through (%) | 68.5 | 98.3 | 97.5 | 67.8 |
| 115 mesh through (%) | 33.7 | 79.1 | 78.3 | 34.1 |
| 150 mesh through (%) | 6.9 | 45.4 | 44.7 | 5.3 |
| 200 mesh through (%) | 0.4 | 10.1 | 9.3 | 0.3 |
| Thermal stability (190°C) | Blackened in 80 min. | Blackened in 40 min. | Blackened in 50 min. | Blackened in 100 min. |
| Initial colour | Normal | Rather poor | Normal | Good |

TABLE 5

| Exp. No. | 25* | 26 | 27* | 28 | 29* | 30 |
|---|---|---|---|---|---|---|
| Amount of DMVN based on vinyl chloride (wt%) | 0.025 | 0.025 | 0.030 | 0.030 | 0.030 | 0.040 |
| % Conversion at which operation of the condenser was started | ** | 70 | ** | 70 | *** | 65 |
| Polymerization time (hr.) | 10.0 | 10.2 | 8.5 | 8.6 | 8.5 | 7.2 |
| Minimum temperature inside the cooling | 15 | 28 | 11 | 22 | 20 | 15 |

TABLE 5-continued

| Exp. No. | 25* | 26 | 27* | 28 | 29* | 30 |
|---|---|---|---|---|---|---|
| jacket (°C) | | | | | | |
| Control of the temperature inside the vessel at a constant value when the reaction rate accelerated | Good | Good | Not good | Good | Good | Good |
| Number of polymerization reactions repeated before the condenser became blocked | — | — | — | 10 | 3 | 12 |
| Plasticizer absorpticity (PHR) | 24 | 28 | 22 | 26 | 26 | 26 |
| Particle size distribution: | | | | | | |
| 60 mesh through (%) | 99.9 | 99.5 | 98.6 | 99.5 | 99.6 | 99.7 |
| 80 mesh through (%) | 65.1 | 72.1 | 59.1 | 65.2 | 63.5 | 59.1 |
| 200 mesh through (%) | 1.2 | 1.5 | 1.8 | 1.1 | 1.1 | 0.9 |

*Control
**No condenser used.
***The valve on the conduit pipe between the vessel and the condenser was kept open at the start of the polymerization and thereafter, and the condenser was set to operation by flowing water therein when % conversion reached 70.

EXAMPLE 6

A stainless steel polymerization vessel (capacity: 30 m³) equipped with a multi-tubular type condenser (capacity: 20 m³) connecting to the vessel by a conduit pipe on which a valve is provided was charged with vinyl chloride and water in amounts as indicated in the table to follow, 0.05 wt % of partially saponified vinyl acetate based on the weight of the vinyl chloride, 0.02 wt % of hydroxypropyl methyl cellulose based on the weight of the vinyl chloride, and 0.02 wt % of DMVN based on the weight of the vinyl chloride. The temperature inside the vessel was then raised to 57°C, and polymerization was started. When the conversion of the monomer reached 20–30%, the operation of the condenser was started by opening the valve. The polymerization reactions were repeated 10 times, to find out the average time of each polymerization reaction by batches and the average amount of produced polymer per day, as shown in Table 6 hereunder.

For purposes of control, two tests were conducted. In one of them (Control I), the condenser was not operated at all, and in the other test (Control II) it was kept operating throughout the polymerization reactions by passing water and opening the valve when the polymerization was started. The results of these tests are also given in the same table.

TABLE 6

| | This example | Control I | Control II |
|---|---|---|---|
| Vinyl chloride (kg) | 8,000 | 6,500 | 8,000 |
| Water (kg) | 16,000 | 18,000 | 16,000 |
| Average time of each polymerization reaction (hr.)* | 16.5 | 16.5 | 19.5 |
| Average production of polymer (1000kg/day)** | 10.5 | 8.5 | 8.9 |

*Average time required from a charge to the following charge for the repeated 10 polymerization reactions.
**Each batch production × Average time of each polymerization reaction ÷ 24 hours.

In the operation of the above Control I, where the cooling means was merely a cooling jacket provided around the vessel, it was found that the cooling capacity was not sufficient for the charge of vinyl chloride monomer in an amount exceeding 6,500 kg per batch.

In the operation of Control II, where a condenser was operated with water flowed from the start of the polymerization, it was observed that polymer scales deposited in the condenser and an average of 3 hours was needed after each batch for cleaning the polymer scales.

To compare therewith, the example according to the condensation cooling system of the invention could dispense with the cleaning of polymer scales throughout the repeated 10 polymerization reactions, and exhibited a good heat removal, resulting in the production of polyvinyl chloride in an amount of 59,000 kg per day, about 20% over the approximately 50,000 kg per day produced by the controls.

Further, when the series of polyerization reactions according to Control II above were conducted without the cleaning of polymer scales, it was observed that the first batch operation raised no problem, but the second batch operation witnessed the adherence of polymer scales in the condenser, so that its heat-removing capacity decreased to cause the temperature inside the polymerization vessel to rise up to 62°C in 9.5 hours, and at this moment the unreacted vinyl chloride monomer had to be purged out of the vessel.

What is claimed is:

1. In a method for suspension-polymerizing at least one monomer taken from the class consisting of vinyl chloride and a mixture of vinyl monomers having vinyl chloride as a main component in the presence of a suspending agent and a polymerization catalyst in an aqueous medium under agitation and with primary cooling in a vessel, said vessel having a condenser for auxiliary cooling, a passageway between said vessel and said condenser for flow of fluid from said vessel to said condenser, the improvement which comprises isolating said condenser from said vessel by keeping said passageway closed until a conversion of at least 5% is obtained, then opening said passageway and maintaining said auxiliary cooling when said passageway is open.

2. The method of claim 1 wherein said suspending agent is a natural or synthetic organic high polymer which forms a protective colloid in the aqueous medium.

3. The method of claim 1 wherein the passageway is opened before the rate of generation of said heat of polymerization exceeds the heat removing capacity of the primary cooling.

4. The method of claim 1 wherein a surfactant is employed together with a suspending agent for the purpose of dispersing the vinyl monomers.

* * * * *